United States Patent
Birchmeier et al.

(10) Patent No.: US 8,748,786 B2
(45) Date of Patent: Jun. 10, 2014

(54) MULTI-COMPONENT FOOD PACKAGING FOR MICROWAVE OVEN

(75) Inventors: Kathryn Marie Birchmeier, Glenview, IL (US); Paul Andrew Cogley, Gurnee, IL (US); Noriko Sakamoto, Tokyo (JP); Koji Otsuka, Tokyo (JP); Takashi Kado, Tokyo (JP)

(73) Assignees: Kraft Foods Group Brands LLC, Northfield, IL (US); Dai Nippon Printing Co., Ltd., Tokyo (JP)

( * ) Notice: Subject to any disclaimer, the term of this patent is extended or adjusted under 35 U.S.C. 154(b) by 562 days.

(21) Appl. No.: 12/950,478

(22) Filed: Nov. 19, 2010

(65) Prior Publication Data
US 2011/0120993 A1    May 26, 2011

(30) Foreign Application Priority Data

Nov. 19, 2009    (JP) .................................. 2009-264154

(51) Int. Cl.
*H05B 6/80*    (2006.01)
*B65D 51/18*    (2006.01)

(52) U.S. Cl.
USPC ..................... 219/729; 219/734; 220/256.1

(58) Field of Classification Search
CPC .. B65D 1/36; B65D 77/2016; B65D 81/3453; H05B 6/6408
USPC ................. 219/729, 728, 730, 727, 732, 735; 220/256.1, 522, 528, 23.86, 505; 426/120, 107, 113, 112, 124, 118, 234, 426/243, 110, 87, 601; 206/219, 524.4
See application file for complete search history.

(56) References Cited

U.S. PATENT DOCUMENTS

| | | | |
|---|---|---|---|
| 3,561,158 A | | 2/1971 | Marcan |
| 3,659,584 A | | 5/1972 | Doyle et al. |
| 3,741,427 A | | 6/1973 | Doyle |
| 3,985,990 A | | 10/1976 | Levinson |
| 4,013,798 A | | 3/1977 | Goltsos |
| 4,027,132 A | | 5/1977 | Levinson |
| 4,144,435 A | | 3/1979 | Clark et al. |
| 4,348,421 A | * | 9/1982 | Sakakibara et al. .......... 426/394 |
| 4,413,167 A | | 11/1983 | Martel et al. |
| 4,481,392 A | | 11/1984 | Nibbe et al. |
| 4,486,640 A | | 12/1984 | Bowen et al. |

(Continued)

FOREIGN PATENT DOCUMENTS

| | | |
|---|---|---|
| EP | 0462767 A2 | 12/1991 |
| EP | 0531176 A1 | 3/1993 |

(Continued)

*Primary Examiner* — Quang Van
(74) *Attorney, Agent, or Firm* — Fitch, Even, Tabin & Flannery LLP (57) ABSTRACT

A multi-component package is provided which enables simultaneous heat cooking of a food product which does not require a long cooking time and a food product which requires a longer cooking time. The multi-component package includes a lower container having a bottomed, lower container main body for containing a first food product. The container further includes an upper container having an upper container main body for containing a second filled food product. A flange of the lower container main body and a flange of the upper container main body are engaged with each other so that the lower container and the upper container are combined integrally. A vapor vent is provided in a lower container lid material, whereby water vapor generated upon heating of the first food product heats the second food product in the upper container.

11 Claims, 7 Drawing Sheets

(56) References Cited

U.S. PATENT DOCUMENTS

| | | | |
|---|---|---|---|
| 4,501,946 | A | 2/1985 | Nibbe et al. |
| 4,560,850 | A | 12/1985 | Levendusky et al. |
| 4,689,458 | A | 8/1987 | Levendusky et al. |
| D292,887 | S | 11/1987 | Schouten |
| 4,705,927 | A | 11/1987 | Levendusky et al. |
| 4,728,762 | A | 3/1988 | Roth et al. |
| 4,807,776 | A * | 2/1989 | Cortopassi ............... 220/23.83 |
| 4,880,951 | A | 11/1989 | Levinson |
| 4,908,487 | A | 3/1990 | Sarnoff et al. |
| 4,923,704 | A | 5/1990 | Levinson |
| 4,992,638 | A | 2/1991 | Hewitt et al. |
| 4,998,000 | A | 3/1991 | Halloran |
| 5,012,061 | A | 4/1991 | Lesser |
| 5,019,680 | A | 5/1991 | Morino et al. |
| 5,126,520 | A | 6/1992 | Nottingham et al. |
| 5,295,475 | A | 3/1994 | Kaneko |
| 5,370,042 | A | 12/1994 | Tolchin et al. |
| 5,387,781 | A | 2/1995 | Berkoff |
| 5,558,798 | A | 9/1996 | Tsai |
| D379,301 | S | 5/1997 | Lippincott |
| D381,264 | S | 7/1997 | Lippincott |
| 5,660,302 | A | 8/1997 | Trout |
| D387,272 | S | 12/1997 | Lippincott |
| 5,695,798 | A | 12/1997 | Rozzano |
| D394,985 | S | 6/1998 | Curtis et al. |
| 5,797,312 | A | 8/1998 | Brant |
| D417,785 | S | 12/1999 | Daniels |
| 6,040,564 | A | 3/2000 | Ueda et al. |
| 6,054,697 | A | 4/2000 | Woodward et al. |
| 6,054,698 | A | 4/2000 | Mast |
| 6,187,354 | B1 | 2/2001 | Hopkins |
| D443,510 | S | 6/2001 | Doucette |
| D446,719 | S | 8/2001 | Garraway |
| 6,307,193 | B1 | 10/2001 | Toole |
| 6,318,246 | B2 | 11/2001 | Fukushima et al. |
| 6,455,084 | B2 | 9/2002 | Johns |
| 6,488,973 | B1 | 12/2002 | Wright |
| D469,350 | S | 1/2003 | Zettlemoyer et al. |
| D471,100 | S | 3/2003 | Guzowski |
| D471,766 | S | 3/2003 | Bradley et al. |
| 6,559,431 | B2 | 5/2003 | Hopkins |
| 6,639,199 | B1 | 10/2003 | Ross, Jr. |
| D484,797 | S | 1/2004 | Kipperman et al. |
| D487,870 | S | 3/2004 | Stewart et al. |
| D494,857 | S | 8/2004 | Chen et al. |
| 6,786,351 | B2 | 9/2004 | Krueger |
| 6,803,551 | B2 | 10/2004 | Kim et al. |
| 6,818,873 | B2 | 11/2004 | Savage et al. |
| 6,825,452 | B2 | 11/2004 | Oh |
| D499,645 | S | 12/2004 | Edwards |
| 6,847,022 | B2 | 1/2005 | Hopkins, Sr. |
| D506,926 | S | 7/2005 | Halliday et al. |
| 6,953,920 | B2 | 10/2005 | Jeon |
| D513,979 | S | 1/2006 | Snedden et al. |
| D514,438 | S | 2/2006 | Snedden et al. |
| D514,439 | S | 2/2006 | Snedden et al. |
| D514,440 | S | 2/2006 | Snedden et al. |
| D514,441 | S | 2/2006 | Snedden et al. |
| D514,929 | S | 2/2006 | Snedden et al. |
| D514,930 | S | 2/2006 | Snedden et al. |
| D514,931 | S | 2/2006 | Snedden et al. |
| D514,952 | S | 2/2006 | Zerfas |
| D517,405 | S | 3/2006 | Snedden et al. |
| 7,015,442 | B2 | 3/2006 | Tucker, Jr. et al. |
| 7,019,271 | B2 | 3/2006 | Wnek et al. |
| 7,030,346 | B1 | 4/2006 | Miao |
| 7,034,268 | B2 | 4/2006 | Hopkins, Sr. |
| D522,355 | S | 6/2006 | Castellanos et al. |
| D527,626 | S | 9/2006 | Weiss et al. |
| D528,014 | S | 9/2006 | Cutts et al. |
| D528,412 | S | 9/2006 | Snedden et al. |
| 7,112,771 | B2 | 9/2006 | Richardson et al. |
| D531,024 | S | 10/2006 | Feldmeier |
| 7,141,771 | B2 | 11/2006 | Hopkins, Sr. |
| D533,075 | S | 12/2006 | Snedden et al. |
| 7,205,517 | B2 | 4/2007 | Hoh |
| 7,217,908 | B2 | 5/2007 | Orrico et al. |
| D544,790 | S | 6/2007 | Bouveret et al. |
| D553,010 | S | 10/2007 | Cutts et al. |
| D555,475 | S | 11/2007 | Enriquez et al. |
| D558,045 | S | 12/2007 | Templeton |
| D567,672 | S | 4/2008 | Sheu |
| D579,769 | S | 11/2008 | Lipinski et al. |
| D587,108 | S | 2/2009 | Maslowski |
| D591,174 | S | 4/2009 | Larson |
| D597,831 | S | 8/2009 | Clark et al. |
| D601,040 | S | 9/2009 | Vovan et al. |
| 7,607,551 | B2 | 10/2009 | Coughlin et al. |
| D611,807 | S | 3/2010 | Miga, Jr. |
| D627,218 | S | 11/2010 | Golota et al. |
| D628,449 | S | 12/2010 | Kulzer |
| D628,450 | S | 12/2010 | Kulzer |
| D634,188 | S | 3/2011 | Sellari et al. |
| D642,484 | S | 8/2011 | Birchmeier et al. |
| D642,937 | S | 8/2011 | Birchmeier et al. |
| D643,309 | S | 8/2011 | Birchmeier et al. |
| D643,310 | S | 8/2011 | Birchmeier et al. |
| 2001/0043971 | A1 | 11/2001 | Johns |
| 2004/0094544 | A1 | 5/2004 | Kim et al. |
| 2005/0184065 | A1 | 8/2005 | Tucker, Jr. et al. |
| 2006/0093709 | A1 | 5/2006 | Minter et al. |
| 2007/0065543 | A1 | 3/2007 | Ishino et al. |
| 2007/0092611 | A1 | 4/2007 | Hinze et al. |
| 2008/0254170 | A1 | 10/2008 | Darin |
| 2009/0039076 | A1 | 2/2009 | Maslowski et al. |
| 2009/0042705 | A1 | 2/2009 | Maslowski et al. |

FOREIGN PATENT DOCUMENTS

| | | |
|---|---|---|
| EP | 1352848 A1 | 10/2003 |
| EP | 1422163 A1 | 5/2004 |
| EP | 1445213 A1 | 8/2004 |
| EP | 1514804 A1 | 3/2005 |
| EP | 1749757 A2 | 2/2007 |
| JP | 61-45376 U | 3/1986 |
| JP | 61-051356 U | 4/1986 |
| JP | 62-008965 U | 1/1987 |
| JP | 63273731 A | 11/1988 |
| JP | 63290329 A | 11/1988 |
| JP | 1240470 A | 9/1989 |
| JP | 2154650 A | 6/1990 |
| JP | 2203820 A | 8/1990 |
| JP | 2203821 A | 8/1990 |
| JP | 7039344 A | 2/1995 |
| JP | 8033211 B | 3/1996 |
| JP | 8217160 A | 8/1996 |
| JP | 10095471 A | 4/1998 |
| JP | 10218254 A | 8/1998 |
| JP | 10291572 A | 11/1998 |
| JP | 2000333649 A | 12/2000 |
| JP | 2001055276 A | 2/2001 |
| JP | 2002179154 A | 6/2002 |
| JP | 2002235925 A | 8/2002 |
| JP | 1152354 S | 9/2002 |
| JP | 1172521 S | 5/2003 |
| JP | 2004187631 A | 7/2004 |
| JP | 2005239219 A * | 9/2005 |
| JP | 2006027665 A | 2/2006 |
| KR | 3019940003024 | 3/1995 |
| WO | 97/17271 A | 5/1997 |
| WO | 99/04638 A2 | 2/1999 |
| WO | 2007/003864 A2 | 1/2007 |

\* cited by examiner

MULTI-COMPONENT FOOD PACKAGING FOR MICROWAVE OVEN

CROSS-REFERENCE TO RELATED APPLICATION

This application claims priority from Japanese Patent Application Number JP 2009-264154, filed Nov. 19, 2009, which is hereby incorporated herein by reference in its entirety.

FIELD

The disclosure relates to food packaging and more particularly to a food package for microwave cooking.

BACKGROUND

A variety of commercially-available packaged food products are prepared by filling a cooked or uncooked food product in a container. The packaged food products, stored at room temperature or in a refrigerator or freezer, are consumed after heating in a microwave. These packaged food products vary greatly in terms of required cooking time in the microwave, which generally depends on the type, volume and storage state of the food product. For example, heating food products stored at room temperature or in a refrigerator, such as cooked bread, is finished within approximately 1 to 2 minute(s), depending on the mass of the food product. On the other hand, many food products that are stored in the frozen state, such as soup, curry and gratin, require a longer heating time, generally of about several minutes.

For such frozen food products requiring longer heating times, containers that promote uniform heating have been developed in order to further shorten the microwave heating time.

Also, containers have been proposed that allow microwave heating and, at the same time, steam warming for frozen or refrigerated food products, such as shaomai, chaotzu and Chinese steamed bun, which are conventionally cooked by steaming. See, e.g., Japanese Patent Publication No. 33211/1996.

However, when frozen or refrigerated soup and bread, for example, are placed in a microwave oven to be cooked together, one of the food products may be insufficiently heated or may be overcooked or burned due to differences in cooking times for the two products. Generally, if one wanted to cook two different food products at the same time, one of the products would be cooked for a longer period of time, such as by cooking it in the microwave for a preliminary period of time before adding the other product to the microwave. However, generally it has been easier for consumers to cook both products separately to ensure that the products are neither overcooked or undercooked. For this reason, it has not conventionally been carried out to cook two food products having different heating requirements or cook times with one microwave oven for the same length of time.

SUMMARY

A multi-component food package is provided herein which allows simultaneous microwave cooking of at least two food products. The food package is a multi-component package including at least a lower container and an upper container. Generally, the food package includes at least two food products with one of the food products requiring less heating than the other. In one aspect, the packaging is configured to allow the heating of one of the food products with the microwave oven while reducing or preventing microwaves emitted from the microwave oven from being irradiated on and heating the other food product. In another aspect, the water vapor or steam generated upon heating one of the food products is utilized for heating the other food product. In yet another aspect, the water vapor generated upon heating one of the food products is utilized to further heat the food product from which the water vapor was generated.

Accordingly, described herein is a method and food package where a first food product is cooked in a lower container at the same time a second food product is cooked in an upper container in the package, where the second food product requires less heating or cooking time than the first food product, and where the water vapor generated upon heating one of the food products is utilized for heating the other food product.

The multi-component food package described herein comprises:
a lower container comprising:
a bottomed, lower container main body configured to contain a first filled food product, the bottomed, lower container main body having an opening and a flange provided on the peripheral edge of the opening, and
a lower container lid material for sealing the opening; and
an upper container comprising:
an upper container main body configured to contain a second filled food product, the upper container main body having an upper surface, side walls, a flange around the perimeter of the container main body, and a bottomed containing portion with an opening therein, and
an upper container lid material for sealing the opening,
the flange of the lower container main body and the flange of the upper container main body being configured to engage each other so that the lower container and the upper container can be coupled together, and
at least one vapor vent being provided in the lower container lid material, whereby the water vapor generated upon heating the first filled food product is released from the lower container to heat the second filled food product of the upper container. The first and second food products are preferably different from each other. The food products may be frozen, refrigerated, or shelf-stable.

In one aspect, the lower container main body is divided by one or more ribs to provide one or more well-like portions. By increasing the number of well portions, the surface area of the container in contact with the food product is increased, which allows the food product to be heated more evenly and quickly.

By one approach, the lower container lid material is provided with an automatic opening or venting feature that permits the lid material to open at a certain pressure, such as a pressure reached in the package after a certain amount of steam has been produced during the cooking process. In another aspect, a sealant can be used to attach the container lid material that softens during heating so as to permit the container lid material to detach during or after the cooking process.

In one aspect, the upper container lid material is effective to at least partially shield microwave radiation from passing therethrough. In another aspect, one or more portions of the upper container can be formed of material that is effective to at least partially shield microwave radiation from passing therethrough. By inclusion of microwave shielding lid material or container materials, the food product will not be exposed to the same amount of microwave radiation as the first food product in the lower container, thus resulting in different energy inputs to the first and second food products during heating in the microwave oven. The heating of the food product within the upper container by the microwave radiation can be controlled through the use of shielding adjacent the second food product.

In one aspect, the food package further comprises a removable inner tray. When an inner tray is provided in the packaging, the food product is filled into the inner tray instead of the lower container main body. In one aspect, the removable inner tray is configured to removably nest in the opening of the lower container main body. In another aspect, the removable inner tray can be configured to mate or snappingly engage with the lower container main body, such as by engagement of the flange of the removable inner tray and the flange of the lower container main body.

The lower container lid material is provided to seal the opening in the lower container main body together with the inner tray. The flanges of the lower container main body and inner tray include raised sealing surfaces for sealing with the lower container lid material. Placement of the raised sealing surfaces allows one to control the flow of water vapor produced during cooking of the food product in the inner tray.

In one aspect, the lower container lid material seals the opening in the lower container main body together with the inner tray but does not seal at least a portion of the inner tray to the lower container main body so as to allow vapor produced by heating of the food product in the inner tray to flow between the underside of the inner tray and the lower container main body. Channels or air passages can be provided to direct the flow of the water vapor. Such flow of water vapor can further promote the heating of the food product in the inner tray by heating the underside of the inner tray. A vapor vent can be provided at one end of the channel to release the water vapor into a space between the underside of the upper container and the lower container. The water vapor filled into that space will heat the food product in the upper container. Due to this arrangement, the water vapor generated from the food product contained in the lower container not only is used for heating of the food product filled in the upper container, but also can be utilized for heating of the food product filled in the lower container. This arrangement advantageously allows greater control of the heating of both products so that the food products can be heated uniformly.

In another aspect, a method is provided for microwave heating a first and second food product. The method includes placing a multi-component package in a microwave, the multi-component package having a first food product sealed in a lower container and a second food product sealed in an upper container, the upper and lower containers being coupled to each other, heating the first and second food products together in the microwave oven while the first food product is in the lower container and the second food product is in the upper container, shielding the second food product to reduce the amount of microwave radiation heating the second food product to less than the amount of microwave radiation heating the first food product, and venting water vapor produced during the heating of the first food product in the lower container to heat the second food product in the upper container. The method may further include directing the water vapor produced by the first food product through a channel to heat the first food product.

DETAILED DESCRIPTION

Hereinafter, a food package is described herein with reference to the drawings. The food package is a multi-component package comprising at least a lower container and an upper container. The lower container comprises a lower container main body portion and a lower container lid material for sealing an opening formed therein. The upper container comprises an upper container main body and an upper container lid material for sealing an opening formed therein. A first food product is provided in the lower container and a second food product is provided in the upper container. The lower container may further include an inner tray.

The food package provided herein allows simultaneous cooking in a single microwave oven of at least a first food product and a second food product, where one of the food products requires longer cooking time than the other. In one aspect, the container provided herein is configured to allow the food product contained in the lower container to be heated while at least partially shielding the microwave radiation from heating the food product contained in the upper container. In another aspect, the food package is configured to permit the water vapor generated from heating the food product in the lower container to be utilized to heat the food product contained in the upper container.

Figures 1, 2:
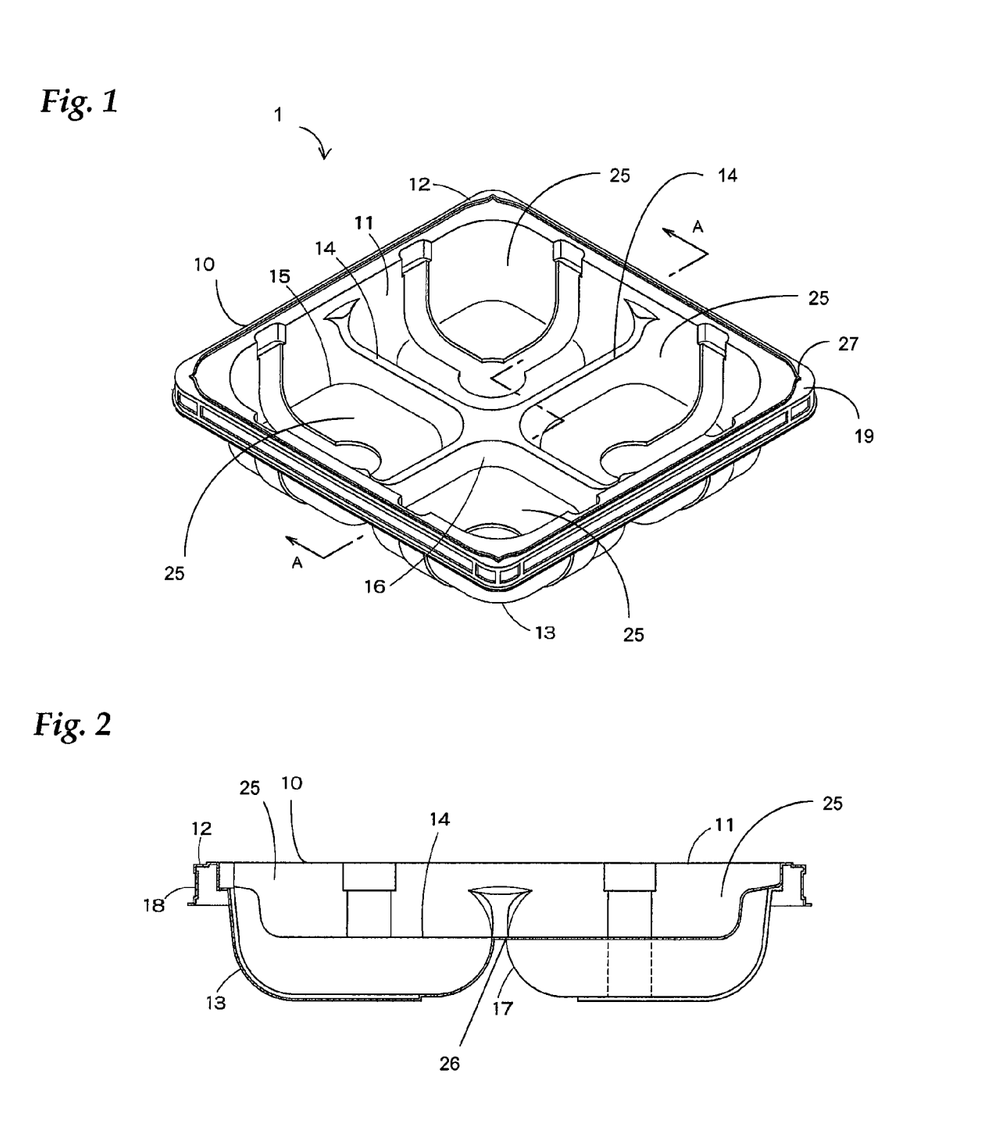
FIG. 1 is a perspective view showing a lower container of the food package provided herein.
FIG. 2 is a cross-sectional view showing the lower container in FIG. 1 taken along the line A-A.

FIG. 1 is a perspective view showing a lower container of the food package. The lower container 1 comprises lower body portion 10 having an opening 11, and flange 12 provided on the peripheral edge of the opening 11.

As shown in FIG. 1, lower body portion 10 is divided by ribs 14 to provide four well-like portions 25 (also referred to as wells) for containing the filled food product. Although the lower container is illustrated with four well-like portions, the lower container can be provided in other configurations, such as with a single well or two or more well-like portions, if desired. By increasing the number of well portions, the surface area of the container in contact with the food product is also increased, which allows the food product to be heated more evenly and quickly. It is generally more difficult for microwaves emitted from the microwave oven to warm the center part of the filled food product than to warm the periphery thereof. Therefore, the filled food product can be more uniformly warmed by dividing the containing portion of the container into more than one well.

A first filled food product (not shown) can be provided in the lower container main body 10, particularly in the wells 25. In one aspect, the first filled food product includes, but is not limited to, liquid foods, semi-liquid foods, paste foods and solids. For liquid foods, semi-liquid foods, paste foods or the like, that are generally be eaten with a spoon or the like, it is preferable to provide the wells of the container main body 10 with rounded or curved corners 13.

In one aspect, when the containing portion 32 of the container main body 10 is divided by the ribs 14, interior corners 15 (two in each well) where the interior of the container main body 10 and the rib 14 intersect and corners 16 (one in each well) where the ribs 14 intersect are preferably provided with a curved surface at least in the horizontal direction. In another aspect, the interior corners 15 and 16 are provided with a curved surface in at least the vertical direction. In one aspect, interior corners 15 and 16 have the same or similar curvature as curved corners 13 and 17. The curved corners of the respective wells allow the filled food product to be warmed more uniformly and with reduced or no generation of hot spots. As a result, the time required for microwave heat cooking can be shortened.

Further, in one aspect and as shown in FIG. 2, which is a cross sectional view of FIG. 1 taken along the line A-A, the rib 14 is provided so that a bottom surface 17 of the wells located adjacent center 26 of the container has a convex shape. Since it is generally difficult for microwaves to reach the center part of the container as described above, the bottom surfaces of the wells at the center of the container have a convex shape to permit greater amounts of microwave radiation to reach those surfaces and heat the food product in the lower container.

The flange 12 of the lower container main body 10 is configured to engage a flange of an upper container main body, so that the lower container and the upper container can be releasably coupled. The side surface 18 on the peripheral edge of the flange 12 of the lower container main body 10 is configured to engage and/or couple to a complementary surface on the peripheral edge of the flange of the upper container main body, whereby the upper and lower containers can be coupled together. In one aspect, side surface 18 has a convex (or concave) configuration and the peripheral edge of the flange of the upper container main body has a complementary concave (or convex) configuration. In one aspect, the flanges of the lower container main body and upper container main body can mate, snappingly engage, releasably lock, or otherwise cooperate depending on the desired configuration and coupling of the flanges.

In one aspect, the lower container comprises a material having a heatproof temperature of not less than 100° C. and that is permeable to microwaves emitted from a microwave oven. Such materials include, but are not limited to, polyethylene terephthalate, inorganic substance-containing polypropylene, multilayer inorganic substance-containing polypropylene, polypropylene-polyethylene blend, polypropylene/inorganic substance-containing polypropylene/polypropylene, polypropylene/polyvinylidene chloride/polypropylene, multilayer polyethylene/polyvinylidene chloride/nylon, polypropylene/adhesive layer/nylon, polypropylene/adhesive layer/ethylene vinylalcohol saponified product/adhesive layer/polypropylene, polypropylene-polyethylene blend/inorganic substance-containing polypropylene/polypropylene-polyethylene blend, polypropylene-polyethylene blend/polyvinylidene chloride/polypropylene-polyethylene blend, multilayer polyethylene/polyvinylidene chloride/nylon, polypropylene-polyethylene blend/adhesive layer/nylon, and polypropylene-polyethylene blend/adhesive layer/ethylene vinylalchol saponified product/adhesive layer/polypropylene-polyethylene blend. In one aspect, the lower container comprising a material mainly comprising polypropylene and a barrier layer made of EVOH or MXD6 nylon laminated thereon. By one approach, the lower container main body can be molded by a known method such as vacuum forming, pneumatic forming, vacuum pneumatic forming or injection molding.

Figure 3:
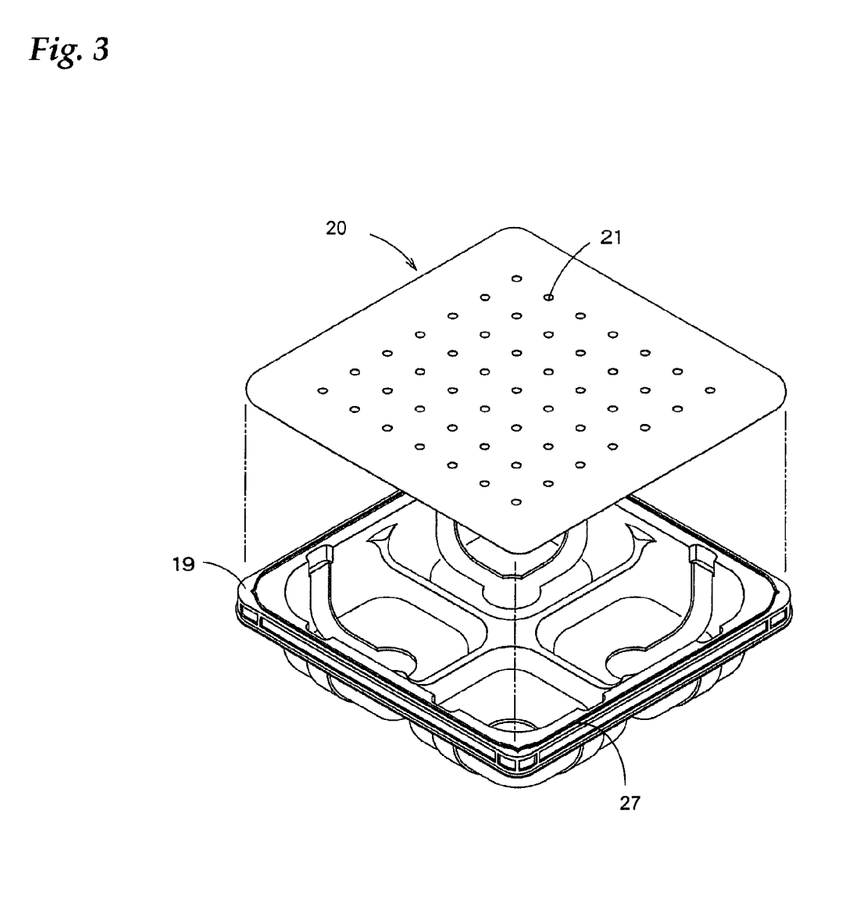
FIG. 3 is a perspective view of the lower container and a lower container lid material for closing the lower container.

The lower container further comprises a lower container lid material 20 for sealing the opening formed in the lower container main body 10, as shown in FIG. 3. The opening 11 of the lower container main body 10 is sealed with lid material 20 so that the filled food product can be stored therein. Further, when the filled food product is a liquid food or a semi-liquid food, the lid material 20 can prevent the filled food product from spilling out of the container.

The lid material 20 is adhered to the opening peripheral edge 19 of the lower container main body 10. In one aspect, the opening peripheral edge 19 includes raised sealing surface 27. The adhering method is not especially limited and can include conventionally known methods. Further, the lid material, after being sealed on the lower container main body described above, is peeled off after the filled food product has been cooked. In one aspect, a tab (not shown) can be provided at any location on the lid material, such as, but not limited to, at one or more of the four corners of the lid material 20. The user can grab the tab(s) to more easily peel the lid material 20 from the flange.

A variety of lid materials can be used. In one aspect, the lid material comprises a laminate film comprising a base material layer and an easy-peel layer. The base material is not especially limited so long as the material is permeable to microwaves emitted from a microwave oven, and for example, polyester and nylon can be used as the base material. While any layer of interface peeling type, cohesion failure type and interlaminar peeling type can be used as the easy-peel layer, inter alia, the easy-peel layer of interlaminar peeling type or cohesion failure type is preferably used. The easy-peel layer of interlaminar peeling type includes, for example, multilayer films formed of polyethylene, polypropylene, ethylene-butene copolymers, ionomer resins, polystyrene, ethylene vinyl acetate copolymers and the like. The easy-peel layer of cohesion failure type includes those comprising ethylene vinyl acetate copolymer-polyethylene blends, polyethylene-polypropylene blends and the like. The seal strength between the lid material and the flange is suitably 2 to 30 N/15 mm width, preferably 5 to 25 N/15 mm width.

For the purpose of sealing the lid material on the raised seal surface of the flange, various methods can be applied, such as, for example, heat seal with a seal mold, impulse seal by instant heavy current, high-frequent seal and ultrasonic seal. The method for heat seal of the lid material on the flange may be a solid seal system, a ring seal system, or a combination thereof, if desired.

Figure 8:
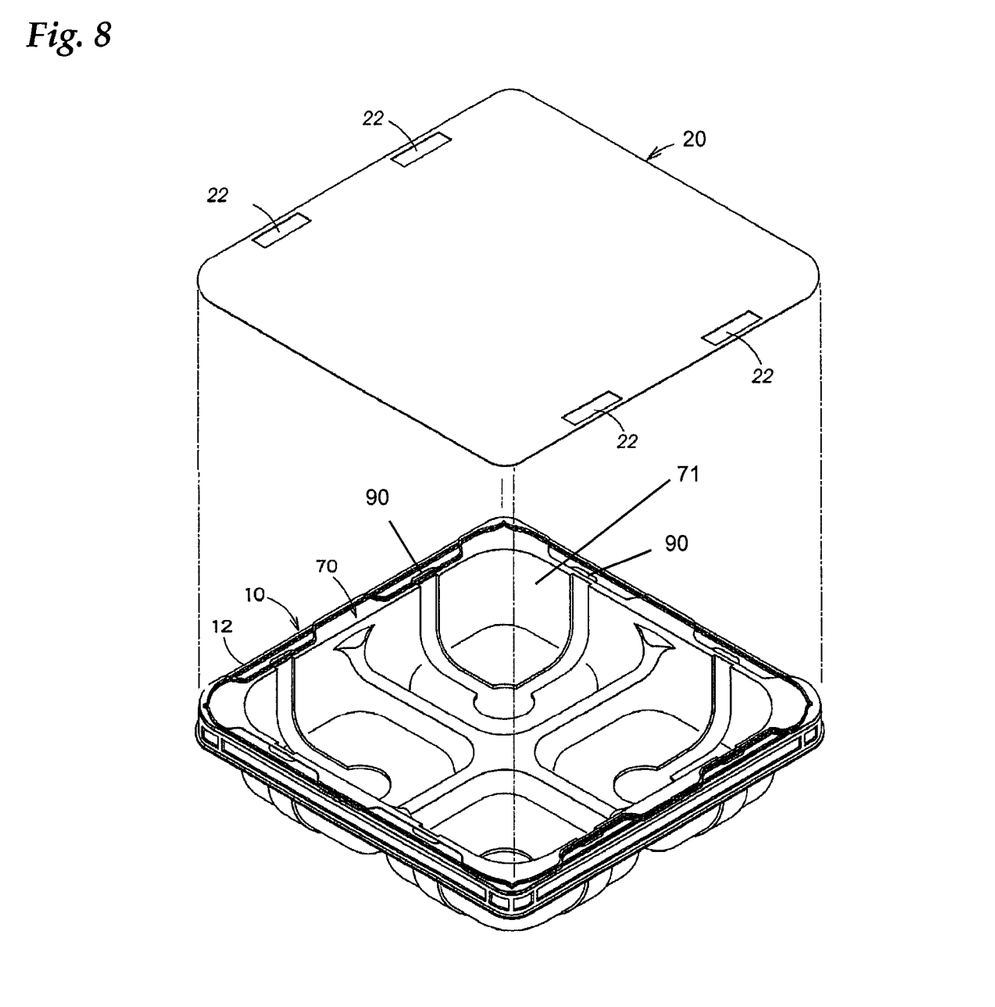
FIG. 8 is an exploded perspective view illustrating the lower container lid material and the lower container with the inner tray nested therein.

By one approach and as shown in FIG. 3, one or more holes 21 may be provided in the lid material 20. By another approach, and as can be seen in FIG. 8, a vapor vent 22 is provided in the lower container lid material 20. The number and shape of the vents or holes may be appropriately controlled depending on the types of filled food products to be heated and the amount of steam needed to heat the food product in the upper container. The vapor vent or hole allows water vapor generated from heating the first filled food product to be released from the lower container into the interior space on the underside of the upper container, as described in more detail below, so that the second filled food product in the upper container can be heated. In another aspect, one or more vapor vents can be formed after the lid material 20 has been sealed on the flange part 12 by peeling back a portion of the lid material before or during heating the food package with the microwave oven.

In yet another aspect, a lid material provided with an automatic opening or venting feature that that permits the lid material to open at a certain pressure, such as a pressure reached in the package after a certain amount of steam has been produced during the cooking process. In another aspect, a sealant can be used to attach the container lid material that softens during heating so as to permit the container lid material to detach during or after the cooking process. Use of a venting feature avoids the need to peel off the lid material from the flange during the use of the microwave oven, and provides good sealing performance of the container in the case where the filled food product is contained therein, thereby leading to storage stability. Conventionally known lid materials with a venting feature can be used, such as, for example, the composite film disclosed in Japanese Patent Laid-Open Publication No. 2002-179154.

Figure 4:
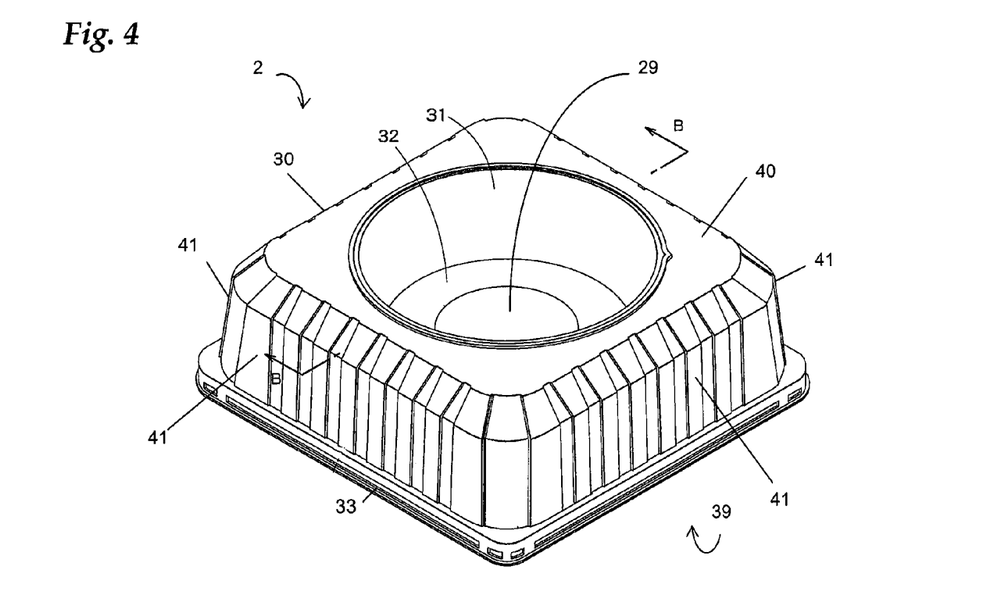
FIG. 4 is a perspective view showing an upper container of the food package provided herein.
Figure 5:
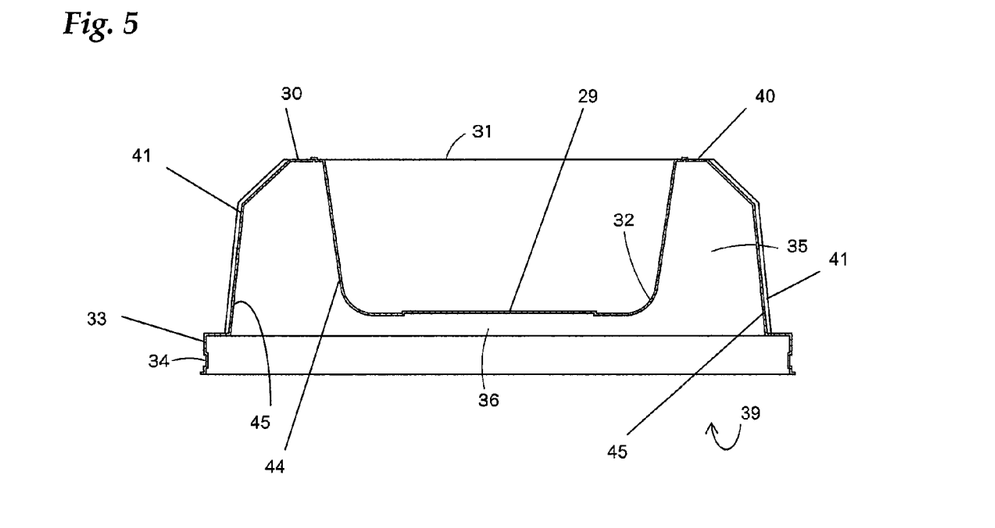
FIG. 5 is a cross-sectional view showing the upper container in FIG. 4 taken along the line B-B.

Now turning to upper container 2 of the package provided herein, FIG. 4 shows an upper container main body 30 comprising an opening 31, a bottomed containing portion 32, an upper surface 40, and side walls 41 which extend downward from upper surface 40 to flange 33. Flange 33 extends around the bottom periphery of the upper container main body 30. The upper container 2 does not include a bottom face other than interior facing surface 44 of containing portion 32. Instead, flange 33 extends about opening 39. As can be seen in FIG. 5, side walls 41 extend below the bottom surface 29 of the containing portion 32.

The shape of the opening 31 is not especially limited and may be, for example, rectangular shape, substantially rectangular shape, circular shape, substantially circular shape, oval shape, substantially oval shape, elliptical shape and substantially elliptical shape. Other shapes may also be used, if desired. The shape of the containing portion 32 is also not especially limited so long as the containing portion 32 has a bottom surface 29 and side walls within which to contain the food product.

If desired, in one aspect, the containing portion 32 can be provided with one or more air holes, pores, or the like for permitting passage of water vapor therethrough. In one aspect, one or more pores or air holes are provided in bottom surface 29. Such pores or holes permit water vapor to contact the food product therein. The desirability of such pores or air holes may depend on the type of food product placed in the containing portion 32 to be heated.

Figure 6:
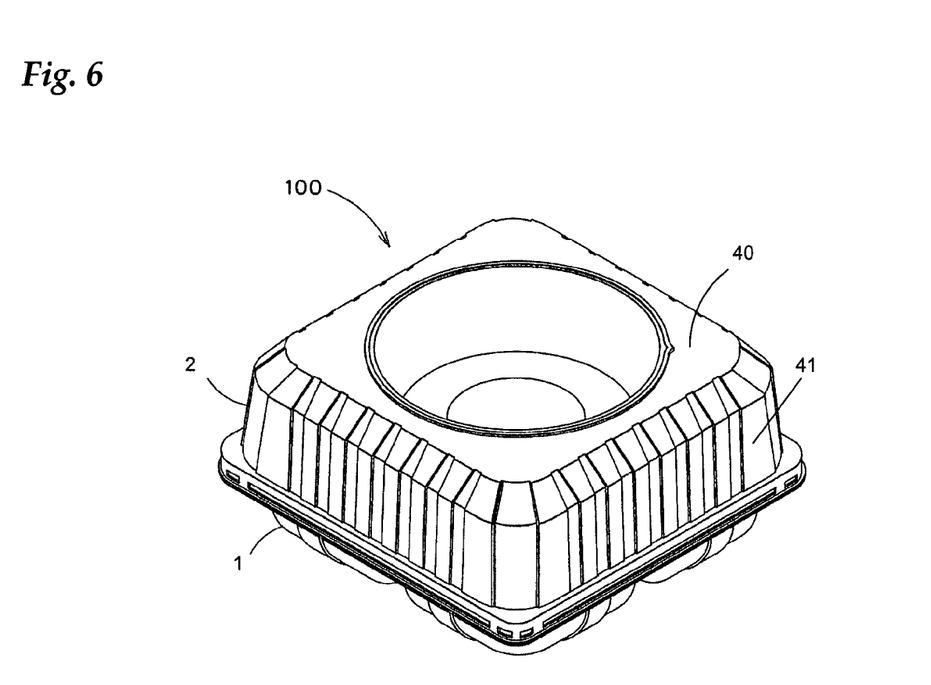
FIG. 6 is a perspective view showing the food package with the lower container and upper container coupled to each other.

As shown in FIG. 5 which is a cross sectional view of the upper container main body in FIG. 4 taken along the line B-B, the flange 33 of the upper container main body 30 is configured to engage the flange 12 of the lower container main body 10 so that the lower and upper containers can be releasably coupled. Flange 33 is provided with a side surface 34 on the peripheral edge of the flange 33 that is configured to engage and/or couple to a complementary surface on the peripheral edge of the flange of the lower container main body, whereby the upper and lower containers can be coupled together to provide the package 100 as shown in FIG. 6. In one aspect, side surface 34 of the flange of the upper container has a convex (or concave) configuration and the peripheral edge of the flange of the lower container main body has a complementary concave (or convex) configuration. The flange 33 of the upper container main body 30 is engaged with the flange 12 of the lower container main body 10 so that the lower container 1 and the upper container 2 are combined to form package 100 as shown in FIG. 6.

Referring again to FIG. 5, the upper container main body 30 is configured to provide interior space 35 between interior-facing surface 44 of containing portion 32 that faces the interior space of the container and the inner surface 45 of side walls 41. Further, since the side walls 41 and flange 33 extend below the bottom surface 29 of the containing portion 32, a space 36 is formed between the lid material 20 of the lower container 1 and the bottom surface of the containing portion 32 when the lower container 1 and the upper container 2 are coupled together as shown in FIG. 6. Interior spaces 35 and 36 are open to each other (i.e., not physically separated) and can be considered the same space for purposes of the upper container shown in the figures. By another approach, it may be desirable to provide one or more physically separated spaces. Vapor fills these spaces upon heating of the lower food product and release of the vapor through one or more vents or holes in the lower container lid material.

By one approach, the lower container main body 10 and/or upper container main body 30 may include portions in wave shape or convexo-concave shape to increase the strength of the container main body.

The upper container further comprises an upper container lid material (not shown) which seals the opening 31 of the container main body 30. The container opening is sealed with the lid material so that the filled food product can be stored hygienically. A variety of lid materials can be used for the upper container lid material. In one aspect, a laminate film comprising a base layer and an easy-peel layer can be used, similarly to the lower container lid material. In another aspect, in order to further shield microwaves emitted from the microwave oven, the upper container lid material may comprise a material capable of at least partially shielding microwave radiation. A synthetic resin sheet provided with a metal foil monolayer or laminate layer of aluminum or the like, or a metalized film, for example, can be used as the lid material capable of at least partially shielding microwaves. In this aspect, the upper container lid material at least partially prevents the microwave radiation from heating the food product in the upper container to the same degree as the food product in the lower container when both food products are heated together in the package in a microwave oven. This advantageously permits one to cook the first and second food products for the same length of time without overcooking the food product in the upper container when that food product requires shorting cooking time than the food product in the lower container.

If desired, one or more portions of the upper container can comprise material capable of at least partially shielding microwave radiation. For example, one or more of the side walls 41 and upper surface 40 can be formed of a material capable of at least partially shielding microwave radiation. In this aspect, one or more portions of the upper container at least partially prevents the microwave radiation from heating the food product in the upper container to the same degree as the food product in the lower container when both food products are heated together in the package in a microwave oven. Inclusion of such materials provides greater control of the amount of microwave radiation reaching the food product in the upper container.

When such radiation shielding materials are included in the upper container lid material or container material, the upper container should be configured to provide the radiation shielding materials at least about 20 mm from the outer peripheral edge of the flange of the upper container main body.

Generally, with microwave cooking, the lower part of the microwave warms more easily than the upper part thereof. Accordingly, when containers are piled up vertically and placed in the microwave oven, the lower container—and the food contents thereof—generally warms more quickly than the upper container. In the package described herein, the lower container warms more quickly than the upper container and water vapor is generated from heating the filled food product in the lower container. This water vapor can be released from the lower container to fill spaces 35 and 36 of the upper container 2 and heat the contents of that container. The heating of the food product of the upper container can thereby at least be partially controlled by limiting the amount of water vapor (i.e., steam) released by the lower container.

The water vapor contributes to the heating of the filled food product in the upper container. However, because the food product in the upper container is at least partially shielded from radiation, the food product in the upper container heats more slowly. Further, because water vapor fills into spaces 35 and 36 when the filled food product of the upper container has not yet been warmed to the same extent as the first food product due to shielding, water vapor may create condensation on the interior surfaces 45 of side walls 41 and interior-facing surface 44 of the containing portion 32 of the upper container. The water droplets absorb microwave radiation and further reduce the amount of radiation that reaches the food product in the upper container. Therefore, when heating is conducted with the microwave oven for a time suitable for warming the filled food product in the lower container, the filled food product in the upper container is at least partially shielded by the water vapor and through shielding materials and receives less microwave radiation than the food product in the lower container. Therefore, the food product in the upper container cooks more slowly. Further, since the filled food product in the upper container is heated by convection by the water vapor generated from the lower container, the cooking of the filled food product in the upper container can be completed at the same time as the food product in the lower container.

The opening 31 of the upper container main body 30 may be smaller than the opening 11 of the lower container main body, and, inversely, may be larger than the opening 11 of the lower container main body. However, it is desirable that the containers be configured such that there is provided a space formed between interior facing surface 44 of the containing portion 32 and interior surface 45 of side walls 41 of the upper container above the lower container. Such a configuration allows water vapor produced by heating the food product in the lower container to contact interior facing surface 44 of containing portion 32 of the upper container main body when the lower container and the upper container are coupled. This space 35, when formed to be larger, can improve the heating efficiency by use of water vapor. In one aspect, in order to make the space 35 larger, it is possible to make the opening 11 of the lower container main body larger and make the containing portion 32 of the upper container main body smaller. In another aspect, the opening face 31 of the upper container main body could be made larger than the opening face 11 of the lower container main body and form the flange of the upper container main body into an inversely conical shape so that the flange of the upper container main body is engaged with the peripheral edge of the flange 12 of the lower container main body.

The first and second food products are preferably, though not necessarily, different from each other. They may be frozen, refrigerated, or shelf-stable. For example, the first food product in the lower container may tend to require a greater amount of energy compared to the second food product in the upper container to bring each product from its initial state to the desired heated state. Therefore, little or no shielding adjacent the first food product is necessary to provide the desired cooking results of the first food product.

The food product in the lower container may comprise one or more of a variety of food products. The type of food product is not particularly limited, although it is generally preferred that the food product in the lower container requires more heating or cooking time than the food product in the upper container.

The food product in the upper container may comprise one or more of a variety of food products. The second food product can comprise a non-liquid food product, such as a bread-based food product like a sandwich, that tends to require a lesser amount of energy to bring the bread and its fillings from a frozen state to that of a preferable warm temperature for consumption. As a result, less microwave energy is needed, thus requiring shielding or a greater degree of shielding adjacent the second food product as compared to the first food product to prevent or restrict the same amount of microwave radiation from heating the second food product.

The food products that can be contained in the package may all initially be in a frozen, refrigerated, or shelf-stable state, but can be heated to any state preferable for consumption. For example, food products can be consumed in a liquid state (i.e., melted or thawed in the container) or can even remain in a relatively frozen state after heating, for consumption. For example, refrigerated or frozen soup, pasta, lasagna, miso soup, jiao-ji, and Chinese steamed bun, which require a longer time for microwave cooking, may be used as the food product in the lower container. The food product in the upper container may be, for example, white rice, rice balls, dough from which bread can be prepared by heat cooking with the microwave oven, and the like. Possible food products may include combinations as crackers and cheese dip, different types of nuts which require different energy inputs, popcorn and soy nuts, a soup and a sandwich, a brownie and a whipped cream, a brownie and ice cream, chili with cheese and sour cream, soup and uncooked bread, sandwich and cottage cheese, vegetables and entrees (such as chicken breast, pasta, etc.), dipping sauce and pizza, macaroni and cheese, cooked bun and hot dog and foods such as caramel or chocolate in cookies, and a grilled cheese sandwich.

Figure 7:
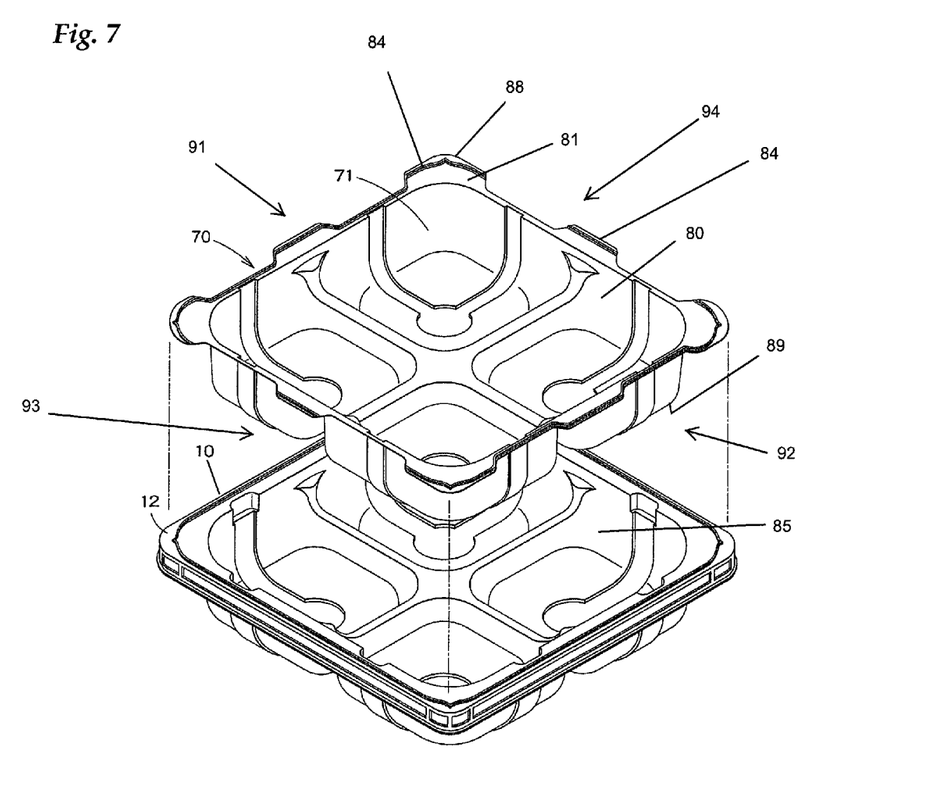
FIG. 7 is a perspective view showing an inner tray positioned in the lower container.

In another aspect, the lower container may further comprise an inner tray 70. Inner tray 70 is configured to removably nest in the opening 11 of the lower container main body 10, as shown in FIG. 7. Main body portion 80 of inner tray 70 can be divided by ribs 82 into a desired number of wells. Generally, the inner tray 70 includes the same number of wells as the lower container so that the inner tray 70 can nest or sit in the lower container main body 10. When inner tray 70 is included in the packaging, the food product is filled into the inner tray 70 instead of the lower container main body 10.

In one aspect, the inner tray 70 can snap fit or otherwise releasably couple or lock to the lower container main body 10. Inner tray 70 has a main body portion 80 having a flange 81 on the upper edge of the main body portion 80. The flange 81 extends around the perimeter of the upper edge of the main body portion 80. Generally, flange 81 has non-linear edges such that tab-like projections 88 are provided on the four corners of the inner tray 70 and at or about the center of the sides of the inner tray. Of course, other configurations of the tab-like projections may also be used, if desired.

In one aspect and as shown in FIG. 7, on two sides of the inner tray (sides 91 and 92 of the inner tray shown in FIG. 7), which are generally but not necessarily opposite of each other, flange 81 includes raised sealing surface 84 that extend the entire length of those sides. The other two sides (sides 93 and 94 of the inner tray shown in FIG. 7) include raised sealing surface 84 that does not extend the length of those sides. While flange 12 of the lower container is shown with a continuous raised sealing surface 27 around the perimeter of the flange, the raised sealing surface 27 may also be discontinuous so long as the discontinuity does not result in undesired or uncontrolled release of steam from the lower container.

When the inner tray 70 is positioned in the opening 11 of the lower container main body 10 as shown in FIG. 8, the opening 71 of inner tray 70 can be sealed by the lid material 20. In one aspect, at least one hole or vapor vent 22 is provided in lid material 20 as shown in FIG. 8. The lid material 20 is sealed to raised sealing surface 27 on the peripheral edge of the flange 12 of the lower container main body 10 and raised sealing surface 84 of flange 81 of the inner tray 70. By doing so, the inner tray 70 and lower container main body 10 are sealed together as shown in FIG. 9.

Figure 9:
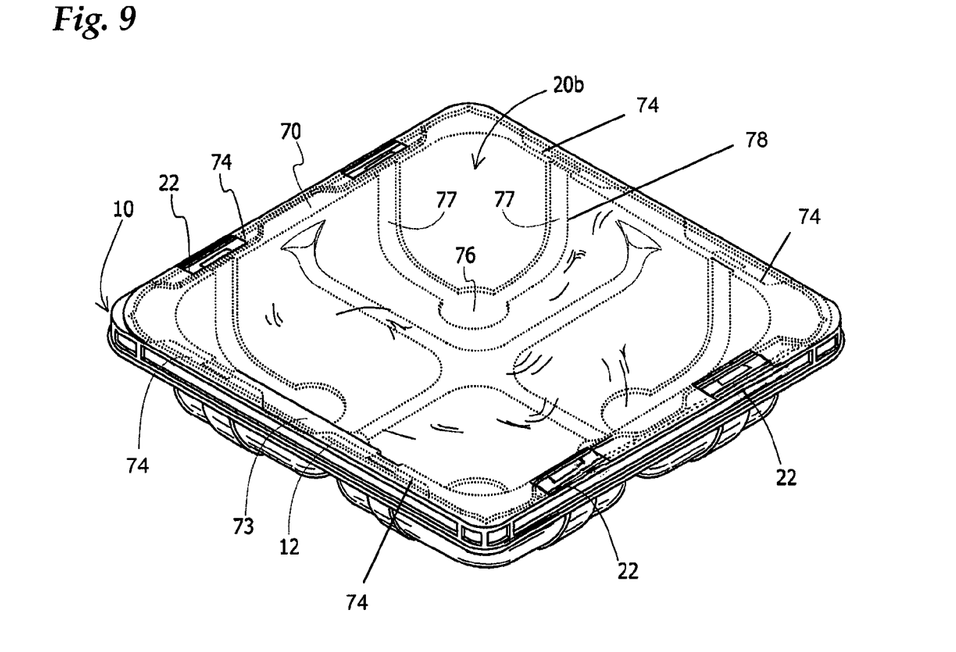
FIG. 9 is a perspective view showing the lower container lid material sealed on the lower container and the inner tray.

FIG. 9 further illustrates lid material 20 having vapor vent 22 sealing inner tray 70 and lower container main body 10. As described above, on sides 93 and 94 of the inner tray 70, flange 81 does not include raised sealing surface 84 along the entire width of those sides. Accordingly, when lid material 20 is sealed to the inner tray 70 and lower container main body 10, the entire perimeter of the lower container is sealed but inner tray 70 is not sealed by the lid material along the areas of those sides lacking raised sealing surfaces 84. Thus, although the lower container main body 10 and the inner tray 70 are sealed with the lid material 20, portions 74 of the inner tray 70 are not sealed.

Referring to FIG. 9, in portions 74 where the inner tray 70 is not sealed onto the flange 12 of the lower container, the lid material 20 is sealed only to flange 12 of the lower container main body 10. Accordingly, the water vapor generated from heating the filled food product in the inner tray 70 will pass into unsealed portions 74. The water vapor will then flow into one or more gaps or openings 90 formed between the flanges of inner tray 70 and the lower container main body 10. The water vapor then flows into one or more air passages or channels 78 formed between the bottom surface 89 of the inner tray 70 and lower main body 10 upper surface 85. Channels 78 include side portions 77 and central portion 76. Side portions 77 of channels 78 direct the water vapor from the openings at either end of the channel to central portion 76. The water vapor exit for channels 78 is provided at openings 90 formed between the flanges of inner tray 70 and lower container main body 10.

Figure 10:
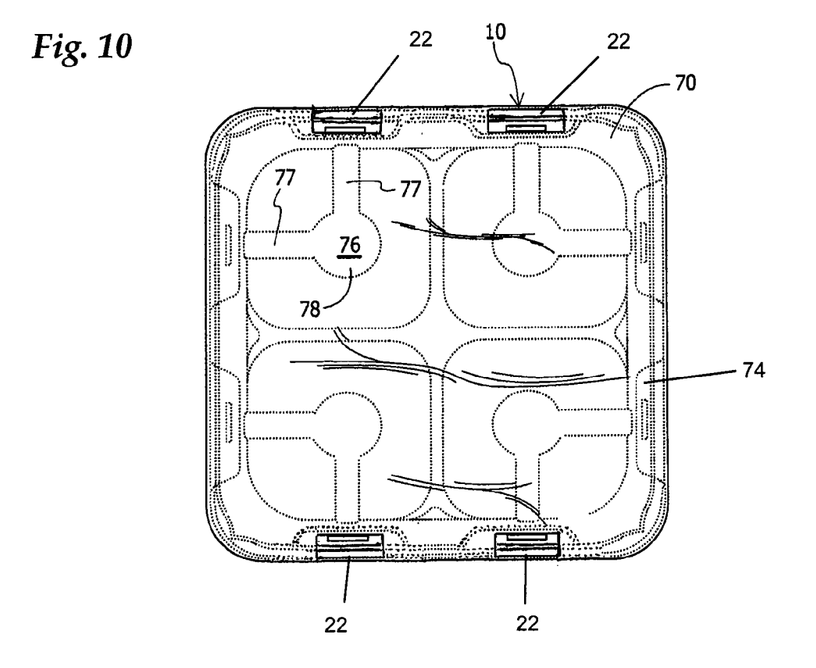
FIG. 10 is a top plan view of FIG. 9.

In this aspect, one or more air passages 78 may be provided between the lower container main body 10 and the inner tray 70 so that the water vapor generated from the filled food product in the inner tray 70 is guided to the vapor vent 22 provided in the lid material as shown in FIG. 10. Further, as shown in FIGS. 8 and 9, because the lid material 20 is provided with vapor vents 22, the water vapor in channels 78 between the inner tray 70 and the lower container main body 10 is released through vapor vents 22 into spaces 35 and 36 of the upper container.

Due to such a configuration, the water vapor generated upon microwave heating of the filled food product in inner tray 70 of the lower container results in the heating of both the food product in the lower container as well as the container in the upper container. The water vapor flows along side portions 77 and central portion 76 of the channels 78, which are positioned on the underside of the wells of the inner tray so that the heating of the filled food product in the inner tray 70 can be promoted.

For example, when the lower container main body 10 is divided into four containing portions or wells by ribs 14, the channel 78 is provided in the respective containing portions or wells so that more uniform vapor heating can be attained.

Although the precise positioning and configuration of air passage 78 is not especially limited, the channel 78 can be provided to extend downward, to change the direction at the bottom portion 76 of the containing portion and then to reach the vapor vent 22 of the lid material 20, so that the water vapor generated from the inner tray 70 moves along the underside of the wells and reaches the central portion 76 of the underside of the wells of the inner tray before flowing through side portion 77 and out the exit of the channel and into the interior space of upper container 2.

Until the filled food product warms completely, water vapor may be cooled by the filled food product and form condensation. However, by virtue of the air passage or channel described above, the condensation on the inner surface of the air passage is converted to water vapor upon heating with microwaves emitted from the microwave oven, so that the air passage is not occluded by the water drops.

The multi-component package may be the only outer package, or other outer package may also be provided in addition to the film wrapper. Any type of outer packaging may be used, such as, for example, film wrapper, paperboard, or a combination thereof.

In another aspect, a method is provided for microwave heating a first and second food product. The method includes placing a multi-component package in a microwave, the multi-component package having a first food product sealed in a lower container and a second food product sealed in an upper container, the upper and lower containers being coupled to each other, heating the first and second food products together in the microwave oven while the first food product is in the lower container and the second food product is in the upper container, shielding the second food product to reduce the amount of microwave radiation heating the second food product to less than the amount of microwave radiation heating the first food product, and venting water vapor produced during the heating of the first food product in the lower container to heat the second food product in the upper container. The method may further include directing the water vapor produced by the first food product through a channel to heat the first food product.

Although the food package is illustrated in a generally square geometry, the food package, as well as the lower and upper containers, may be provided in other geometries, such as, but not limited to, circular, oval, and rectangular geometries.

EXAMPLES

Hereinafter, the food package provided herein will be explained in more detail by way of Examples and Comparative Examples, but is not limited to these Examples.

Example 1

A polypropylene sheet having a thickness of 800 μm was vacuum-formed and pneumatically formed to prepare an upper container as shown in FIG. 4. A mixture obtained by kneading 30 g of a bread mix and 30 g of water is filled in the resulting upper container, and the container opening was sealed by a film constituted from a PET layer/an aluminum foil layer/a heat seal layer.

Next, a polypropylene sheet having a thickness of 800 μm was vacuum-formed and pneumatically formed to prepare a lower container as shown in FIG. 1. 300 cc of soup was filled in the resulting lower container. A film constituted from a PET layer/ONY (biaxially oriented nylon)/a heat seal layer was prepared, and vapor vent holes having a diameter of 10 mm were provided in the film so that the holes were positioned on the four corners of the lower container. This film was sealed on a seal flange of the lower container.

The upper and lower containers sealed by the film were combined integrally, and the coupled containers were stored in a freezer at −19° C. for 24 hours.

Thereafter, the coupled containers were subjected to heat cooking for 8 minutes using an 1100-W turn table type microwave oven. After completion of heating, the coupled containers were removed from the microwave oven, and then separated into the upper and lower containers. Then, the seal films of the respective containers were peeled off to check the filled products.

As a result, soft bread having good texture was produced in the upper container. Further, the soup contained in the lower container had a liquid temperature of 70° C. and was heated uniformly.

Example 2

Upper and lower containers similar to those used in Example 1 were prepared. A mixture obtained by kneading 30 g of a bread mix and 30 g of water was filled in the upper container, and the container opening was sealed by a film constituted from a PET layer/an aluminum foil layer/a heat seal layer.

Next, 300 cc of soup was filled in the lower container. A film constituted from a PET layer/ONY/a heat seal layer was prepared, and 20 vapor vent holes having a diameter of 2 mm were provided at positions corresponding to the opening of the lower container when the opening is sealed with the film. This film was sealed on the seal flange of the lower container.

The upper and lower containers sealed by the film were coupled, and the coupled containers were stored in a freezer at −19° C. for 24 hours.

Thereafter, the coupled containers were subjected to heat cooking for 8 minutes using an 1100-W turn table type microwave oven. After completion of heating, the coupled containers were removed from the microwave oven, and then separated into the upper and lower containers. Then, the seal films of the respective containers were peeled off to check the filled products.

As a result, soft bread having good texture was produced in the upper container. Further, the soup contained in the lower container had a liquid temperature of 70° C. and was heated uniformly.

Example 3

Upper and lower containers similar to those used in Example 1 were prepared. 60 g of rice and 90 g of water were filled in the upper container, and the container opening was sealed by a film constituted from a PET layer/an aluminum foil layer/a heat seal layer.

Next, 300 cc of miso soup was filled in the lower container. A film with automatic opening function constituted from a PET layer/ONY/a heat seal layer was prepared, and this film was sealed on the seal flange of the lower container.

The upper and lower containers sealed by the film were combined after retort sterilization under the temperature condition of 121° C.×30 minutes, and the combined containers were stored at room temperature.

Thereafter, the containers were subjected to heat cooking for 3 minutes using an 1100-W turn table type microwave oven. After completion of heating, the coupled containers were removed from the microwave oven, and then separated into the upper and lower containers. Then, the seal films of the respective containers were peeled off to check the filled products.

As a result, rice boiled to the perfect degree of softness was produced in the upper container. The temperature of the boiled rice was 50° C. Further, the miso soup contained in the lower container had a liquid temperature of 70° C. and was heated uniformly.

Example 4

A polypropylene sheet having a thickness of 800 μm was vacuum-formed and pneumatically formed to prepare an upper container as shown in FIG. 4. 15 pores having a diameter of 2 mm were provided in the bottom surface of the concave part of the upper container. 150 g of steamed meat bun was filled in this upper container, and the container opening was sealed by a film constituted from a PET layer/an aluminum foil layer/a heat seal layer.

Next, a lower container similar to that used in Example 1 was prepared, and 300 cc of Chinese soup was filled therein. A film constituted from a PET layer/a ONY layer/a heat seal layer was prepared, and 20 vapor vent holes having a diameter of 2 mm were provided at positions corresponding to the opening of the lower container when the opening was sealed with the film. This film was sealed on the seal flange of the lower container.

After coupling the upper and lower containers sealed by the film, the coupled containers were stored in a refrigerator at 3° C. for 24 hours. The refrigerated Chinese soup was solidified in a gelatin-like state.

Thereafter, the coupled containers were subjected to heat cooking for 3 minutes 30 seconds using an 1100-W turn table type microwave oven. After completion of heating, the coupled containers were removed from the microwave oven, and then separated into the upper and lower containers. Then, the seal films of the respective containers were peeled off to check the filled products.

As a result, a softly-steamed Chinese meat bun having good texture was produced in the upper container. Further, the Chinese soup contained in the lower container had a liquid temperature of 70° C. and was heated uniformly.

Comparative Example 1

A flanged cup obtained by vacuum-forming and pneumatically forming a polypropylene sheet having a thickness of 800 μm was filled with a mixture obtained by kneading 30 g of a bread mix and 30 g of water, and a cup opening was sealed by a film constituted from a PET layer/a heat seal layer.

Next, a lower container similar to that used in Example 1 was prepared, and 300 cc of soup was filled therein. Then, a film constituted from a PET layer/a heat seal layer was sealed on the seal flange of the lower container.

The cup and lower container were stored in a freezer at −19° C. for 24 hours.

Thereafter, the cup and lower container were aligned in parallel on a turn table and were subjected to heat cooking for 8 minutes using an 1100-W turn table type microwave oven. After completion of heating, the cup and container were removed from the microwave oven, and the seal films of the cup and the lower container were peeled off. Then, the filled products were checked.

As a result, although the soup contained in the lower container had a liquid temperature of 70° C. and was heated uniformly, the bread in the cup turned to a brown solid.

While the packaging described herein has been described by means of specific embodiments and applications thereof, numerous modifications and variations could be made thereto by those skilled in the art without departing from the scope of the invention set forth in the claims.

The invention claimed is:

1. A multi-component package comprising:
   a lower container comprising:
      a bottomed, lower container main body configured to contain a first food product, the lower container main body having a lower container opening and a flange provided on a peripheral edge of the lower container opening, and
      a lower container lid material for sealing the lower container opening; and
   an upper container comprising:
      an upper container main body configured to contain a second food product, the upper container main body having an upper container opening, a bottomed containing portion having a bottom surface and a containing portion side wall extending between the bottom surface and the upper container opening, an upper surface extending from a peripheral edge of the upper container opening to an upper container main body side wall, the upper container main body side wall extending downwardly from the upper surface to an upper container main body flange located below the bottom surface of the containing portion,
   the flange of the lower container main body and the flange of the upper container main body being configured so that the lower container and the upper container can couple to each other,
   at least one vapor vent provided in the lower container lid material, whereby the water vapor generated upon heating the first food product is released from the lower container to heat the second food product of the upper container,
   wherein the lower container further comprises an inner tray nested in the opening of the lower container main body, the inner tray configured to contain the first food product, and wherein the inner tray has a main body portion having a flange on the upper edge and extending around a perimeter thereof, and the flange including discontinuous raised sealing surfaces for sealing with the lower container lid material.

2. The multi-component package according to claim 1, wherein the lower container main body comprises a first food product and the upper container main body comprises a second food product, wherein the first food product requires a longer microwave cooking time than that necessary for the second food product.

3. The multi-component package according to claim 1, wherein the upper container comprises a material effective to at least partially shield microwaves from heating the second food product.

4. The multi-component package according to claim 1, wherein the lower container main body is divided by at least one rib to provide two or more wells in the lower container main body.

5. The multi-component package according to claim 1, wherein the lower container lid material is not sealed to the entirety of the flange of the inner tray due to the discontinuous raised sealing surfaces on the flange of the inner tray.

6. The multi-component package according to claim 5, wherein the flange of the inner tray has non-linear edges to provide tab-like projections.

7. The multi-component package according to claim 5, wherein one or more air passages are provided between the lower container main body and the inner tray, the one or more air passages configured to guide water vapor produced from the heating of the first food product below the inner tray and through the vapor vent in the lower container lid material into a space between the lower container and upper container.

8. A multi-component package comprising:
   a lower container comprising:
      a bottomed, lower container main body having a lower container opening and a flange provided on a peripheral edge of the lower container opening,
      an inner tray nested in the opening of the lower container main body and configured to contain a first food product, the inner tray having a flange with a non-linear perimeter to form tab-shaped flange portions and having a discontinuous raised sealing surface on an upper surface of the flange, and
      a lower container lid material having at least one vapor vent provided therein,
      wherein at least one pair of gaps are formed between the flange of the lower container main body and the flange of the inner tray, the at least one pair of gaps in gaseous communication with at least one channel formed between the lower container main body and inner tray and configured to permit passage of water vapor between a top surface of the lower container main body and a bottom surface of the inner tray, wherein the at least one vapor vent of the lower container lid material is positioned adjacent one of the gaps of the at least one pair of gaps, and
   an upper container comprising an upper container main body configured to contain a second food product, the upper container main body having an upper container opening, a bottomed containing portion having a bottom surface and a containing portion side wall extending between the bottom surface and the upper container opening, an upper surface extending from a peripheral edge of the upper container opening to an upper container main body side wall, the upper container main body side wall extending downwardly from the upper surface to an upper container main body flange located below the bottom surface of the containing portion,
   wherein the flange of the lower container main body and the flange of the upper container main body configured so that the lower container and the upper container can couple to each other.

9. The multi-component package according to claim 8, wherein the lower container lid material is not sealed to the entirety of the flange of the inner tray due to the discontinuous raised sealing surfaces on the flange of the inner tray.

10. The multi-component package according to claim 8, wherein the upper container comprises a material effective to at least partially shield microwaves from heating the second food product.

11. The multi-component package according to claim 8, wherein the lower container main body is divided by at least one rib to provide two or more wells in the lower container main body.

* * * * *